(12) United States Patent
Baghsorkhi et al.

(10) Patent No.: US 11,429,849 B2
(45) Date of Patent: Aug. 30, 2022

(54) DEEP COMPRESSED NETWORK

(71) Applicant: Intel Corporation, Santa Clara, CA (US)

(72) Inventors: Sara Baghsorkhi, Los Gatos, CA (US); Matthew Sotoudeh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1131 days.

(21) Appl. No.: 15/977,477

(22) Filed: May 11, 2018

(65) Prior Publication Data
US 2019/0042926 A1    Feb. 7, 2019

(51) Int. Cl.
*G06N 99/00*   (2019.01)
*G06F 16/35*   (2019.01)
*G11C 16/10*   (2006.01)
*G06F 16/24*   (2019.01)
*G06N 3/063*   (2006.01)
*G06F 17/16*   (2006.01)
*G06N 3/04*    (2006.01)
*G06N 3/08*    (2006.01)

(52) U.S. Cl.
CPC .............. *G06N 3/063* (2013.01); *G06F 17/16* (2013.01); *G06N 3/04* (2013.01); *G06N 3/0445* (2013.01); *G06N 3/0454* (2013.01); *G06N 3/082* (2013.01)

(58) Field of Classification Search
CPC ...... G06N 3/063; G06N 3/0454; G06N 3/082; G06N 3/0445; G06N 3/04; G06N 3/08; G06F 17/16

USPC ....................................................... 706/1–62
See application file for complete search history.

(56) References Cited

U.S. PATENT DOCUMENTS

| 2014/0019388 A1* | 1/2014 | Kingsbury | G06N 3/08 706/12 |
| 2014/0156575 A1* | 6/2014 | Sainath | G06N 7/005 706/16 |
| 2015/0170020 A1* | 6/2015 | Garimella | G06N 3/082 706/14 |
| 2017/0083811 A1* | 3/2017 | Cho | G11C 13/004 |
| 2018/0053550 A1* | 2/2018 | Rakshit | G11C 16/10 |
| 2018/0121796 A1* | 5/2018 | Deisher | G06N 3/0472 |
| 2018/0165554 A1* | 6/2018 | Zhang | G06K 9/6256 |
| 2018/0174034 A1* | 6/2018 | Obradovic | G06N 3/0635 |

OTHER PUBLICATIONS

Sotoudeh et al., "DeepThin: A self-compressing library for deep neural networks", sysml.cc/doc/33.pdf, 2018, 3 pages.
Chen et al., "Compressing neural networks with the hashing trick", Proceedings of the 32nd International Conference on International Conference on Machine Learning, 2015, 10 pages.

(Continued)

*Primary Examiner* — Brandon S Cole
(74) *Attorney, Agent, or Firm* — Jordan IP Law, LLC

(57) ABSTRACT

An embodiment of a semiconductor package apparatus may include technology to apply a low rank factorization to a weight matrix of a decision network to determine a first weight matrix approximation, reshape the first weight matrix approximation into a second weight matrix approximation, and compress the decision network based on the second weight matrix approximation. Other embodiments are disclosed and claimed.

21 Claims, 9 Drawing Sheets

(56) References Cited

OTHER PUBLICATIONS

Han et al., "Deep compression: Compressing deep neural networks with pruning, trained quantization and huffman coding", International Conference on Learning Representations (ICLR), 2016, 14 pages.
Ha et al., "Hypernetworks", arxiv.org/pdf/1609.09106.pdf, 2016, 29 pages.
Sotoudeh et al., "DeepThin: A self-compressing library for deep neural networks", arxiv.org/pdf/1802.06944.pdf, Feb. 2018, 15 pages.
Sainath et al., "Low-rank matrix factorization for deep neural network training with high-dimensional output targets", IEEE International Conference on Acoustics, Speech and Signal Processing, 2013, 5 pages.

* cited by examiner

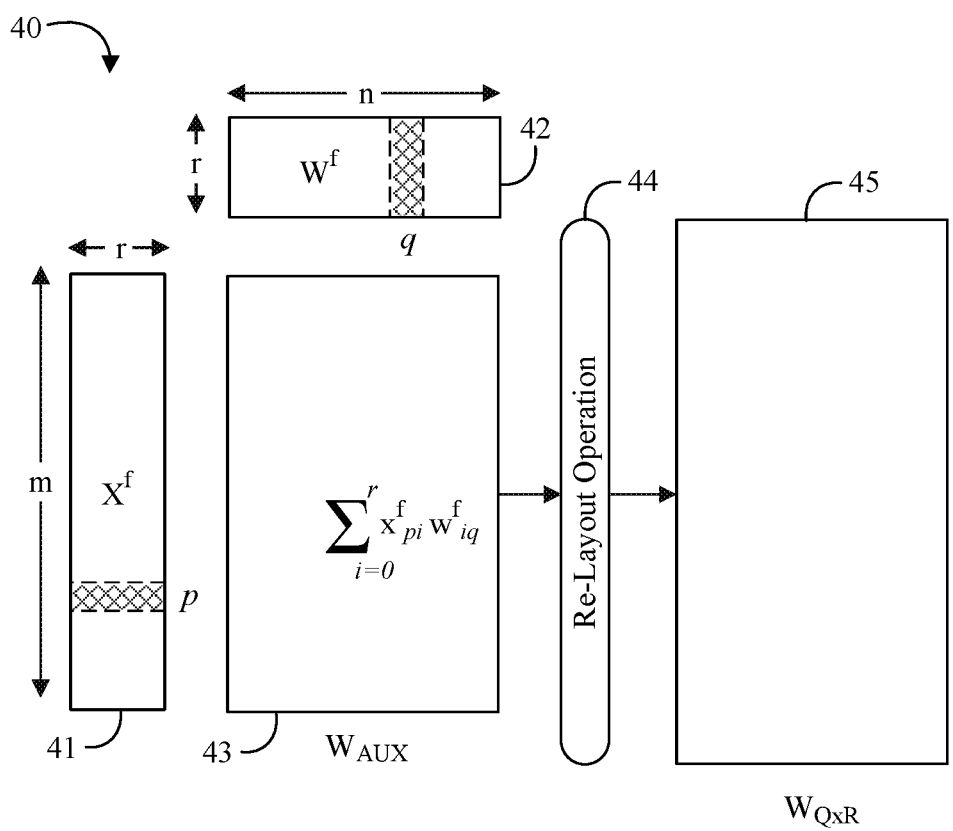
FIG. 4
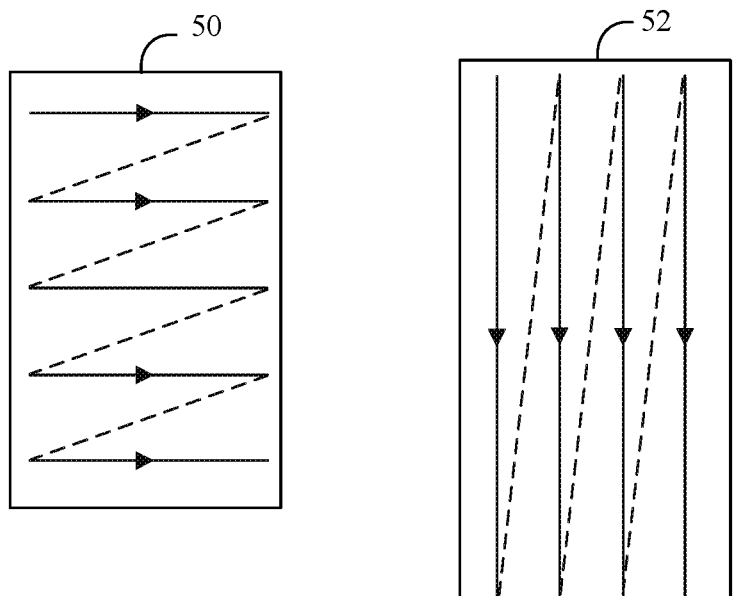
FIG. 5A
FIG. 5B

DEEP COMPRESSED NETWORK

TECHNICAL FIELD

Embodiments generally relate to machine learning systems. More particularly, embodiments relate to a deep compressed network.

BACKGROUND

Machine learning technology may include neural networks such as convolutional neural networks (CNNs), deep neural networks (DNNs), and recurrent neural networks (RNNs). In general, there may be a trade-off between the accuracy of a neural network and the size of the trained neural network. For example, compressing a neural network too much may decrease the useful accuracy of the neural network.

BRIEF DESCRIPTION OF THE DRAWINGS

The various advantages of the embodiments will become apparent to one skilled in the art by reading the following specification and appended claims, and by referencing the following drawings, in which:

FIG. 4 is a block diagram of an example of machine learning network according to an embodiment;

FIGS. 5A and 5B are illustrative diagrams an example of a nonlinear transfer function according to an embodiment;

DESCRIPTION OF EMBODIMENTS

Figure 1:
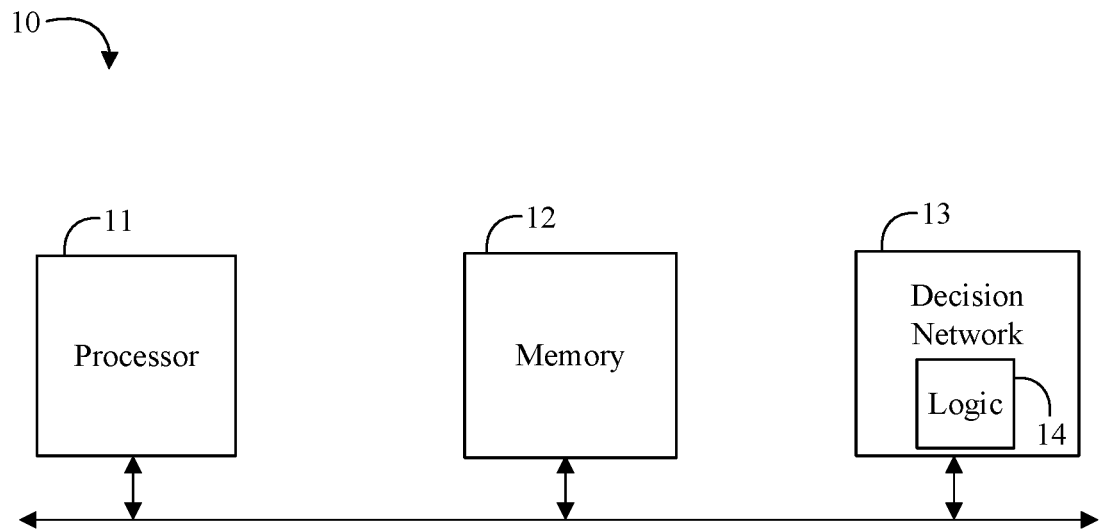
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and a decision network 13 communicatively coupled to the processor 11 and the memory 12. The decision network 13 may include logic 14 to apply a low rank factorization to a weight matrix of the decision network 13 to determine a first weight matrix approximation, reshape the first weight matrix approximation into a second weight matrix approximation, and compress the decision network based on the second weight matrix approximation. For example, the logic 14 may be configured to reshape the first weight matrix approximation into the second weight matrix approximation to add nonlinearity to the second weight matrix approximation. In some embodiments, the logic 14 may be configured to scatter data from the first weight matrix approximation into the second weight matrix approximation. In some embodiments, the logic 14 may alternatively, or additionally, be configured to alter the layout of data from the first weight matrix approximation into the second weight matrix approximation. For example, the logic 14 may be configured to read data from the first weight matrix approximation in a row-major order, and write data into the second weight matrix approximation in a column-major order (e.g., or vice versa). In any of the embodiments herein, the decision network 13 may comprise one or more of a CNN, a DNN, and a RNN. In some embodiments, the decision network 13 and/or the logic 14 may be located in, or co-located with, various components, including the processor 11 (e.g., on a same die).

Embodiments of each of the above processor 11, memory 12, decision network 13, logic 14, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 14, applying a low rank factorization to a weight matrix of the decision network 13 to determine the first weight matrix approximation, reshaping the first weight matrix approximation into the second weight matrix approximation, etc.).

Figure 2:
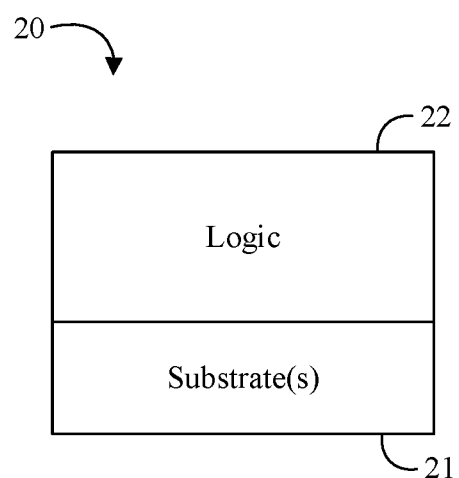
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to apply a low rank factorization to a weight matrix of a decision network to determine a first weight matrix approximation, reshape the first weight matrix approximation into a second weight matrix approximation, and compress the decision network based on the second weight matrix approximation. For example, the logic 22 may be configured to reshape the first weight matrix approximation into the second weight matrix approximation to add nonlinearity to the second weight matrix approximation. In some embodiments, the logic 22 may be configured to scatter data from the first weight matrix approximation into the second weight matrix approximation. In some embodiments, the logic 22 may alternatively, or additionally, be configured to alter the layout of data from the first weight matrix approximation into the second weight matrix approximation. For example, the logic 22 may be configured to read data from the first weight matrix approximation in a row-major order, and write data into the second weight matrix approximation in a column-major order (e.g., or vice versa). In any of the embodiments herein, the decision network may comprise one or more of a CNN, a DNN, and a RNN. In some embodiments, the logic 22 coupled to the one or more substrates 21 may include transistor channel regions that are positioned within the one or more substrates 21.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIG. 3), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3:
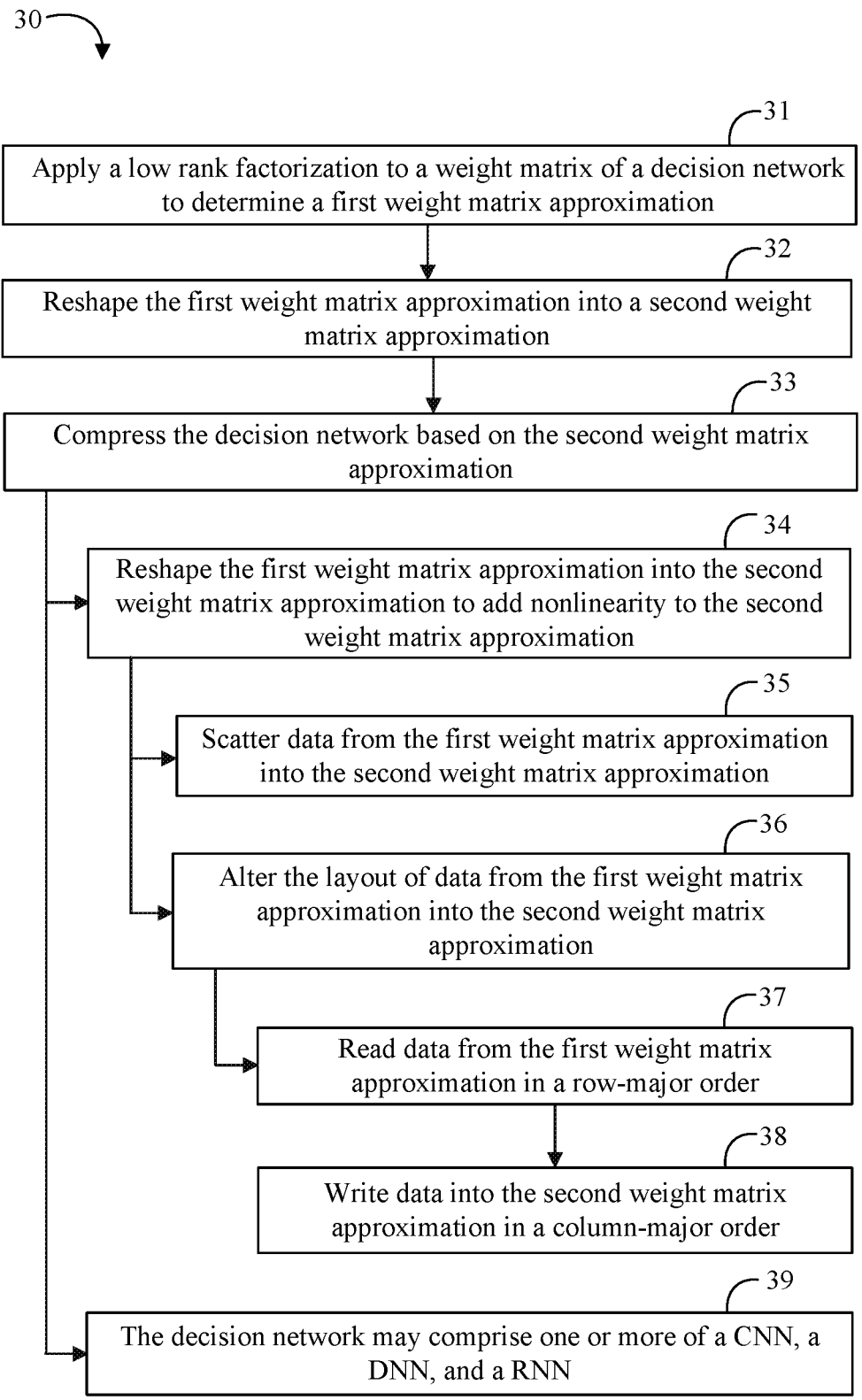
FIG. 3 is a flowchart of an example of a method of compressing a weight matrix according to an embodiment.

Turning now to FIG. 3, an embodiment of a method 30 of compressing a weight matrix may include applying a low rank factorization to a weight matrix of a decision network to determine a first weight matrix approximation at block 31, reshaping the first weight matrix approximation into a second weight matrix approximation at block 32, and compressing the decision network based on the second weight matrix approximation at block 33. For example, the method 30 may include reshaping the first weight matrix approximation into the second weight matrix approximation to add nonlinearity to the second weight matrix approximation at block 34. Some embodiments of the method 30 may include scattering data from the first weight matrix approximation into the second weight matrix approximation at block 35. Alternatively, or additionally, some embodiments of the method 30 may include altering the layout of data from the first weight matrix approximation into the second weight matrix approximation at block 36. For example, the method 30 may include reading data from the first weight matrix approximation in a row-major order at block 37, and writing data into the second weight matrix approximation in a column-major order at block 38 (e.g., or vice versa). In any of the embodiments of the method 30, the decision network may comprise one or more of a CNN, a DNN, and a RNN at block 39.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS).

Some embodiments may advantageously provide self-compressing technology for a neural network (e.g., a CNN, a DNN, a RNN, etc.). Machine learning (ML) technology may increasingly be used in consumer-facing products, such as speech recognition in personal digital assistants (PDAs), object classification in image manipulation software, etc. Some ML technology may rely on large weight matrices which encode the relationships between different nodes in a network. For many applications, the ML technology may preferably run directly on a client device (e.g., a smartphone, tablet, PDA, etc.). However, the size, cost, performance and resource requirements of such ML technology may make it more practical/feasible to execute the inference model on high-end servers and stream the results back to the client. Some embodiments may advantageously reduce one or more of the size, cost, and/or resource requirements, and may increase the performance of ML technology, to improve the feasibility of running such ML technology on a client device.

One approach for reducing the total number of free parameters in a network is iterative pruning. A large network is initially trained, then the subset of connections with magnitude closest to 0 are removed. This train-prune cycle is repeated until the network reaches a desired size and accuracy. Iterative pruning, however, may have some problems in practice. First, there is no way of storing the pruned network that fully realizes the reduction in free parameters. Common storage methods for sparse matrices, including compressed-sparse-row and -column formats, more than double the actual stored size of the network when compared to the number of free parameters.

Furthermore, pruning works by taking advantage of the fact that the vast majority of weights in a network are unimportant to the final output. After removing all of those weights, however, further pruning forces the network to remove increasingly important connections. This causes highly pruned models to lose accuracy rapidly and, empirically, limits the effectiveness of pruning when targeting compressed sizes significantly smaller than 1/50 of the original model.

HashedNetworks are similar to weight clustering, except the assignment of weight to cluster is determined according to a hash function (so only the cluster means, and not the weight-cluster mapping, need to be stored). Essentially, each element of the weight matrix is chosen at computation time from a vector of possible values according to the hash of its row and column indices. Such HashedNetworks require the computation of a hash function for each weight in the network, adding significant computational complexity to a model. Furthermore, HashedNetworks rely on random memory access patterns which are difficult to optimize. Finally, because weights are shared randomly in a layer, it is difficult for HashedNetworks to learn logical local patterns in data (e.g., such as those present in speech, image, and other continuous data).

HyperNetworks use a small "internal" network to generate the weights for the main "outer" network. HyperNetworks may change their weights over time, but the technology also has significant compression potential. HyperNetworks may require hand-designed different, complex internal networks for each class of model, making it more difficult to apply HyperNetworks to new model architectures without significant engineering overhead.

In some other models, weight matrices may be factored into smaller matrices at training time to aid in distributed model training. Conceptually, weight factorization can be thought of as a special case of the HyperNetwork idea, where the "internal" network is represented by a simple multiplication of the two matrix factors. A pretraining scheme may be used to fix the values of one of the factored matrices before training. These pretrained matrix values, while not needing to be further trained, are not efficiently distributable, significantly limiting the technique's effectiveness beyond improving training efficiency on distributed systems.

Some embodiments may compress an inference model to a size which may be efficiently executed directly on the client device. Advantageously, some embodiments may reduce the model space requirement while providing good prediction accuracy. Some embodiments may also improve runtime performance, and/or may not significantly impact model development time. Some embodiments may improve upon the technology area of low rank factorization. Some embodiments may provide a deep, thin compression technology that addresses a symmetry issue with extremely low-rank matrix factorization of machine learning model parameters (e.g., as explained in more detail herein). For example, some embodiments may utilize an auxiliary intermediate matrix and an efficient re-layout operation to add a nonlinearity and improve rank factorization inference accuracy. Some embodiments may provide better accuracy at the same size as compared to some other compression technology (e.g., including compression technology that requires more expensive compute and memory operations). Some embodiments may also provide improved performance and/or lower energy utilization (e.g., power savings).

Some embodiments may be implemented in C++ with TENSORFLOW operations built on top of an INTEL MATH KERNEL LIBRARY (MKL), and may demonstrate improved inference performance (e.g., speed-ups from 2× to 14× over uncompressed models). Some embodiments may replace a matrix multiplication of $Y=X \cdot W_{Q \times R}$ with $Y \approx X \cdot \text{transpose}(X^f \cdot W^f)$ in the kernel operations (e.g., as explained in more detail herein).

Some DNNs may include conceptual "layers" chained one after another, through which input data passes sequentially until finally reaching a desired output. Each layer may compute a matrix multiplication between the outputs of the previous layer and the current layer's weight matrix. After computing the matrix multiplication, bias terms may be added and a non-linear activation function may be applied to the output. RNNs may be utilized for data with some time dependency. In some applications, the weight matrix may be large and may benefit from compression technology in accordance with some embodiments. Although there are different types of RNNs, they generally involve a model containing a number (e.g., three or four) of compute steps similar to the layers in a DNN. Such models may be more parameter efficient than regular DNNs, but they still require large weight matrices to achieve useful levels of accuracy and accordingly may also benefit from compression technology in accordance with some embodiments. For visual data, CNNs may sweep learned filter banks (e.g., weights) over the input data to extract common features. Each sweep step may be computationally similar to the layer operation described above. Because the size of input and output buffers in some convolutional networks represent an unusually large percent of actual network memory requirements (e.g., due to large number of input/output channels), greater compression impact may be achieved in other applications of RNNs and feed forward DNNs (although some CNNs may benefit from compression in accordance with some embodiments).

Some embodiments may apply compression to each layer's weight matrix independently. A single layer with a non-linear activation function a, weights W, and biases B may be defined as:

$$Y = a(X \cdot W + B) \quad \text{[Eq. 1]}$$

where W and B are learnable parameters that may be stored within the network. As the size of B may often be negligible compared to W, some embodiments may compress only the W parameter (e.g., although some embodiments may apply suitable compression techniques to the B parameter as well). Some embodiments may compress (e.g., with some acceptable loss of accuracy) any model that relies on storing large weight matrices such as W.

Some conventional rank factorization compression techniques may work by replacing the weight parameter W with the dot product of two lower rank matrices:

$$W_{Q \times R} \approx X^f \cdot W^f \quad \text{[Eq. 2]}$$

where $X^f$ is a Q by r matrix and W is an r by R matrix, where r corresponds to a rank factor. During training, the error signal may be backpropagated to the low rank factors $X^f$ and $W^f$ to update their elements the same way a regular weight matrix is trained. The learned factors may then be used to reconstruct the original weight matrix at each layer during the forward training or inference passes. Lower rank factorizations of a weight matrix (e.g., specifically when r equals 1), may be more appealing from both a storage and computational efficiency standpoint. But as r becomes smaller, rows/columns of the reconstructed weight matrix begin to resemble each other. In some scenarios, for r=1, every set (e.g., row) of weights generated by the low rank approximation may be a semi-scaled copy of the weight vector W. This artificial resemblance/symmetry may considerably impact the learning performance and capacity of a network.

Turning now to FIG. 4, an embodiment of a ML network 40 may include a first matrix 41 ($X^f$) and a second matrix 42

($W^f$). To reduce the negative impact that some artificial constraints may have on network learning capacity, some embodiments may first apply rank approximation to an auxiliary weight matrix 43 ($W_{AUX}$) of size m by n as follows:

$$W_{AUX} \approx X^f \cdot W^f \quad \text{[Eq. 3]}$$

where $X^f$ is an m by r matrix and $W^f$ is an r by n matrix. The network 40 may further include a re-layout operation 44 to redistribute elements of $W_{AUX}$ into another weight matrix 45 ($W_{Q \times R}$) such that the artificial symmetry is broken. In some embodiments, the reshaping process may add non-linearity to the approximation function (e.g., similar to how an activation function may add a nonlinear decision boundary to a network's output layer). In some embodiments, the re-layout function may be tuned/optimized by choosing the number of columns in the second matrix 42 ($W^f$) to be prime with respect to the number of rows in the weight matrix 45 ($W_{Q \times R}$).

Any suitable nonlinear redistribution technology may be used for the re-layout operation 44. One example of a suitable nonlinear transfer function may include logic/technology to randomly scatter elements of the auxiliary weight matrix $W_{AUX}$ into the weight matrix $W_{Q \times R}$. However, for some applications a scattering function may not be efficient as desired (e.g., due primarily to the random memory accesses involved), and may require a matrix of indices to relate the original position to the re-laid-out position, which may limit the compressibility.

Turning now to FIGS. 5A and 5B, an embodiment of another suitable nonlinear transfer function may include logic/technology to distribute rows of a first weight matrix approximation 50 (e.g., corresponding to $W_{AUX}$ 43 in FIG. 4) along columns of a second weight matrix approximation 52 (e.g., corresponding to $W_{Q \times R}$ 45 in FIG. 4). For example, some embodiments may include technology to input/process/read data from the first weight matrix approximation 50 in a row-major order, and output/process/write data into the second weight matrix approximation 52 in a column-major order. Such reshaping may be particularly useful when computing a matrix multiplication because the altered layout may construct a column (e.g., or part of a column) of the second weight matrix approximation 52 at a time, in an array of consecutive memory locations, while multiplying the columns by different rows of an input matrix X. Accordingly, the altered layout (e.g., also referred to as "re-layout") may make full use of the generated elements before discarding them. Additionally, some embodiments of the re-layout may achieve better accuracy as compared with the random scatter reshaping. In some embodiments, columns of the first weight matrix approximation 50 may alternatively be distributed along rows of the second weight matrix approximation 52 to break the symmetry.

Some embodiments of a nonlinear reshape function may still result in repetition patterns in matrix $W_{Q \times R}$ in the form of blocks (e.g., of columns) scaled slightly differently. Some embodiments may set the number of columns in the matrix $W^f$ to be prime with respect to the number of rows in the matrix $W_{Q \times R}$. For example, values of Q and n may be selected such that:

$$LCM(n, Q) = n \times Q \quad \text{[Eq. 4]}$$

where LCM is the least common multiple of the two numbers. The LCM value may determine the repetition frequency of similar, scaled blocks in the matrix $W_{Q \times R}$. For example, the original weight matrix width, Q, may be fixed. Some embodiments may set the largest value for n that is prime with respect to Q.

The parameter n may also need to satisfy other constraints within the compression framework, in accordance with some embodiments. For example, the matrix $W_{AUX}$ may need to have at least as many elements as the matrix $W_{Q \times R}$ such that:

$$m \times n \geq Q \times R \quad \text{[Eq. 5]}$$

In some embodiments, various parameters may also need to abide by a specified compression rate. Because some embodiments may compress weights on a per-matrix basis, the compressed size of any individual compressed matrix in the network may be calculated. A compression ratio of $\alpha$ for a weight matrix of shape $Q \times R$ may be determined as follows:

$$\alpha = \frac{r \times (m + n)}{Q \times R} \quad \text{[Eq. 6]}$$

where the denominator totals the size of the weight matrix $W_{Q \times R}$, and the enumerator sums up the size of low rank factors of the matrix $W_{AUX}$. The size of the bias vector may be omitted from the calculation (e.g., in some embodiments, the bias vector's compression rate may be computed separately as needed). Eq. 6 may also ignore other, much smaller parameters of the network that may not be compressed (e.g., such as batch-normalization parameters). Accordingly, the actual network size may have some overhead and Eq. 6 may approximate the network size. Some embodiments may account for more of or the exact network architecture, and add those other parameters to Eq. 6 to get a more accurate or an exact ratio for the entire network, or to further compress the other parameters to reach a desired overall compression rate.

Based on the inequality in Eq. 5, m may be replaced in Eq. 6 with a lower bound value for each rank factorization value (e.g., r=1, r=2, etc.), to provide a single variable quadratic inequality as follows:

$$\alpha \geq \frac{r \times (((Q \times R)/n) + n)}{Q \times R} \quad \text{[Eq. 7]}$$

for which valid ranges of n can be easily determined if any exist. Within valid ranges, a minimum value of n may be selected that satisfies the conditions expressed by Eqs. 4 and 5. This fine tuning may only happen once during initialization of the network, and the performance overhead may be negligible.

If a valid range for n in Eq. 7 cannot be identified, that may indicate that the spatial overhead of deep, thin compression of the network may surpasses any compression benefit provided for the specific matrix being compressed. An effective lower-bound on the compression rate $\alpha$ supported by some embodiments may be identified by the lowest compression rate $\alpha$ which results in a valid range for n. The lower-bound may be dependent on the size of the original network weight matrix $W_{Q \times R}$ and may often be less than 1/1000 of the original matrix size. Additionally, different matrices in a network may have different shapes and thus different lower bounds. This makes it often possible to over-compress larger matrices in order to compensate for other matrices that may have hit the lower bound, thus achieving a desired overall compressed network size.

Figure 6:
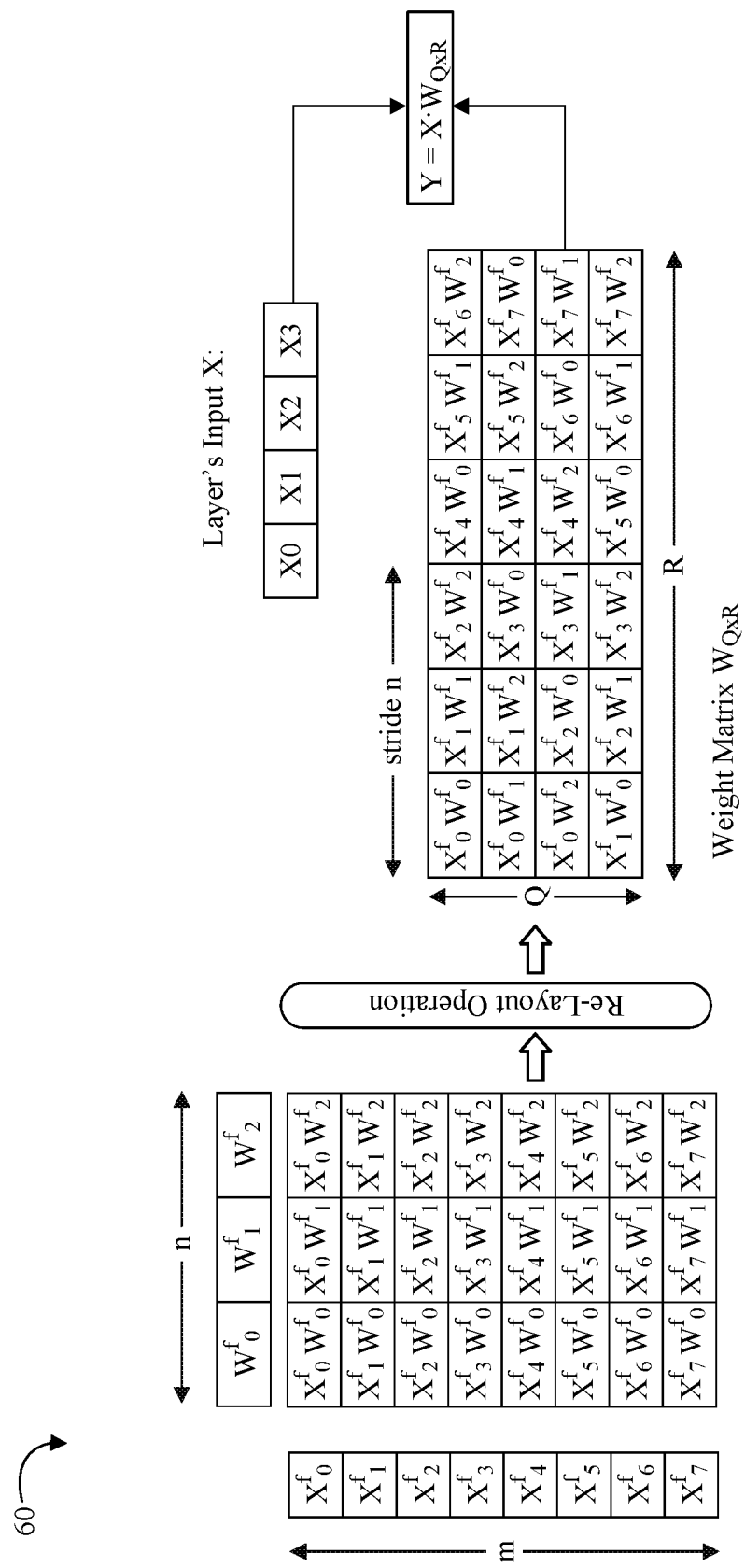
FIG. 6 is an illustrative diagram of a process flow for compressing a neural network according to an embodiment.

Turning now to FIG. 6, an embodiment of a process flow 60 for compressing a neural network may start with a layer's input matrix X and a decompressed weight matrix W. A rank factor approximation may be applied to X and W to provide factored matrices $X^f$ and $W^f$. For example, the decompressed weight matrix W may be considered as having copies of $W^f$ tiled in a column-major fashion throughout the matrix. Each tiled copy of $W^f$ may be scaled by the corresponding scalar in $X^f$, to provide the auxiliary weight matrix $W_{AUX}$. The matrix multiplication may be computed such that each cell in the output matrix $W_{AUX}$ consists of the sum of the dot products between each of the $X^f$-scaled copies of $W^f$ in a single column and the respective slices of the input X. The auxiliary weight matrix $W_{AUX}$ may then be transposed such that values are read in a row-major order from $W_{AUX}$ and written in a column-major order into the compressed, reshaped weight matrix $W_{Q \times R}$. Finally, the output Y may be based on an input matrix X and the compressed, reshaped weight matrix $W_{Q \times R}$ (e.g., $Y = X \cdot W_{Q \times R}$).

Some embodiments may advantageously improve performance of the compressed matrix multiplication. Instead of scaling each copy of $W^f$ by an element of Xf and then computing the dot product against the input slice (e.g., requiring 2×n total multiply-adds), for example, some embodiments may first compute the dot product between the relevant portions of $W^f$ and the input slice, and then scale the resulting scalar value(s) by the scalar elements of $X^f$ (e.g., requiring n+1 multiply-adds). Following the foregoing approach, at certain points in the computation the dot product may be computed between the same elements of $W^f$ and the same input slice (e.g., although that partial product may be later scaled by different elements from $X^f$). Some embodiments may utilize this redundancy to store the resulting dot product after the first time a particular $W^f$ dot product is computed for a particular input slice, and to configure the kernel to scale the stored dot product by all the $X^f$ values using the stored dot product and sum those partial products for all of the cells that make use of that same stored dot product.

With Q and n being relatively prime, after LCM(n, Q)=n*Q entries, every nth column of $W_{Q \times R}$ will be a scaled version of the other. Some embodiments may exploit this redundancy by factoring out the scale operations (e.g., multiplication by $X^f$ elements). For example, a conventional computation may involve the following equations:

$$Y0 = X0 * X^f_0 * W^f_0 + X1 * X^f_0 * W^f_1 + X2 * X^f_0 * W^f_2 + X3 * X^f_1 * W^f_0$$ [Eq. 8]

$$Y3 = X0 * X^f_4 * W^f_0 + X1 * X^f_4 * W^f_1 + X2 * X^f_4 * W^f_2 + X3 * X^f_5 * W^f_0$$ [Eq. 9]

which may require about 11 floating points operations (FLOPS) per column, or about 22 FLOPS total. Some embodiments may instead involve computation of the following equations:

$$P0 = X0 * W^f_0 + X1 * W^f_1 + X2 * W^f_2$$ [Eq. 10]

$$P1 = X3 * W^f_0$$ [Eq. 11]

$$Y0 = X^f_0 * P0 + X^f_1 * P1$$ [Eq. 12]

$$Y3 = X^f_4 * P0 + X^f_5 * P1$$ [Eq. 13]

where Eqs. 10 and 11 may require about 6 FLOPS shared by columns indicated as the stride n part in FIG. 6 and an extra 3 FLOPS per column for a total of about 12 FLOPS.

Advantageously, some embodiments may significantly cut down on the most expensive part of the matrix multiplication, the dot product, by reusing these repetitive computations. The number of times a particular dot product may be reused may decrease as the LCM between the Q and n dimensions increases (e.g., see Eq. 4). Additionally, a larger R dimension may lead to more overall computation, but may also provide more possibilities for reuse.

Figure 7A:
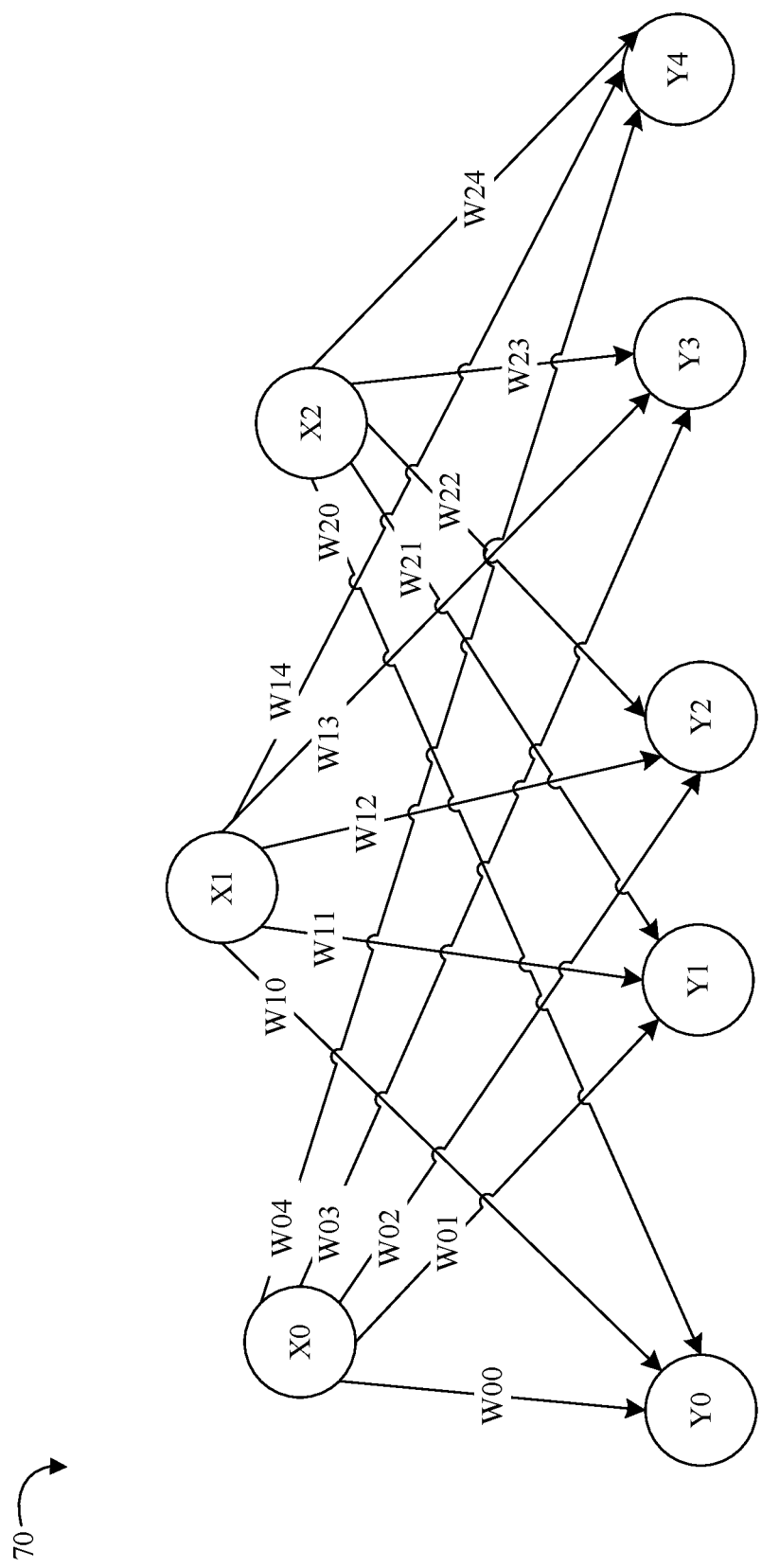
FIGS. 7A and 7B are illustrative diagrams of network layers according to an embodiment.
Figure 7B:
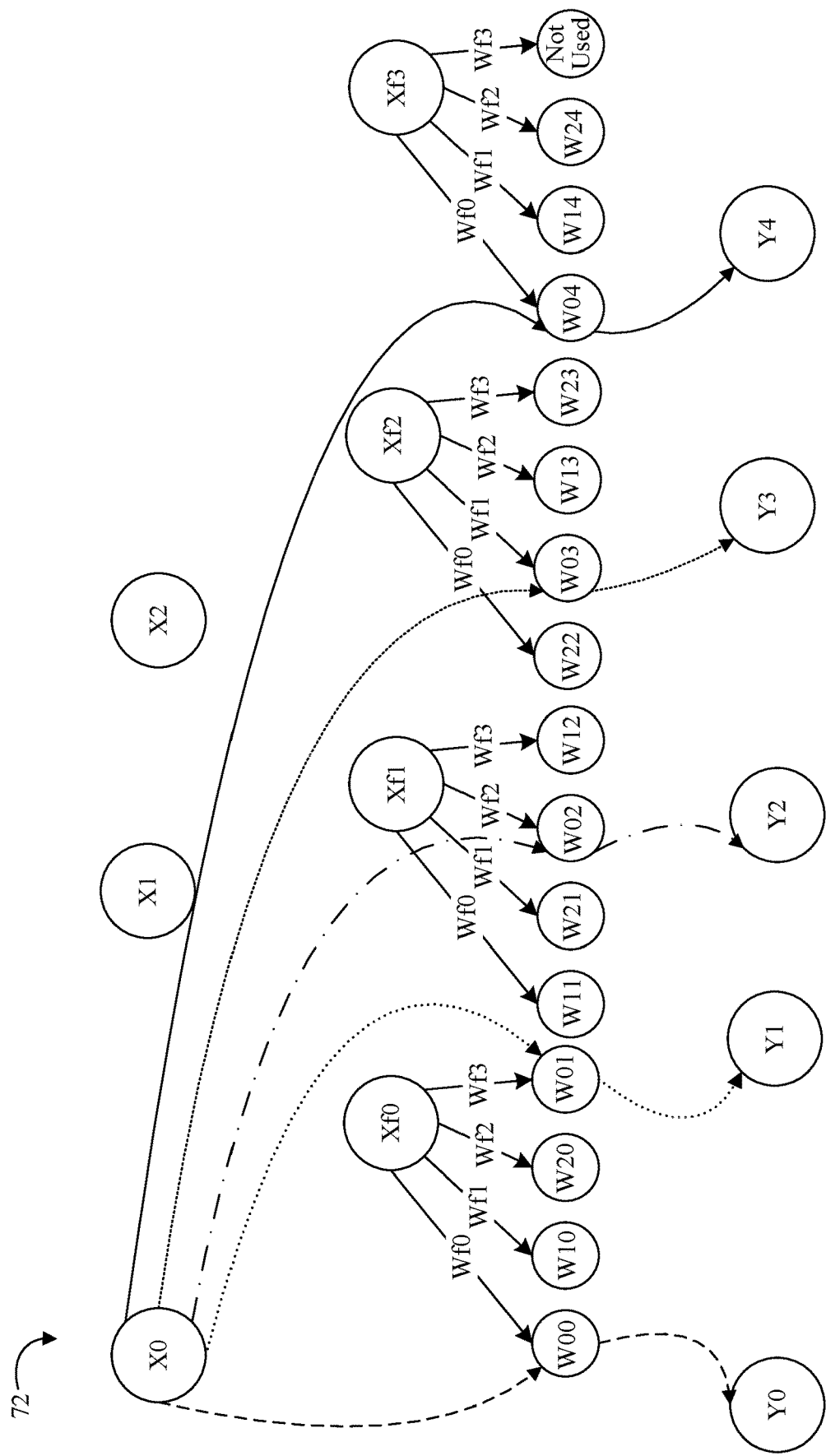

Turning now to FIGS. 7A and 7B, embodiments of illustrative network layer diagrams show an original uncompressed layer 70 and a corresponding compressed layer 72. For the uncompressed layer 70, the weight matrix may be 3×5 with 15 learnable elements labeled as W00 to W24. For the compressed layer 72, the original 3×5 weight matrix elements may be constructed via an inner network. Instead of 15 learnable elements of W00 to W24, for example, the compressed layer 72 may include only 8 learnable elements labeled as Xf0, Xf1, Xf2, X23, Wf0, Wf1, Wf2, and Wf3. The 8 learnable elements in the compressed layer 72 may collectively build the original 15 learnable elements W00 to W24. The network connections/flows from X0 to Y0, Y1, Y2, and Y3 with original weight elements may be built on the fly via the low rank factors Wf and Xf.

Some embodiments of a deep, thin architecture may be configured as an inner, single-layer neural network that may generate the weights for a larger outer network layer, albeit with different technology as compared to a HyperNetwork. Some embodiments of the single-layer inner network may not include a bias or activation function, though the inner network may still benefit from nonlinearity added via the re-layout transformation. Although biases may serve an important role in standard network layers, allowing the network to effectively shift the activation function, some embodiments of an inner networks may omit such biases. For example, values in $W^f$ and $X^f$ may be distributed around a mean of 0. Accordingly, any biases added to the output of the transformation would determine the expected mean of the generated weights $W_{Q \times R}$. Because the original network weights, $W_{Q \times R}$, may also be centered about 0, removing the biases from the inner network does not affect accuracy. Additionally, because some embodiments may not have activation functions on the inner network, biases do not provide the function-shifting benefit. Activation functions, on the other hand, may have squashing effects that may limit the range of values generated for the reconstructed matrix $W_{Q \times R}$ (e.g., a new set of artificial constraints that may impact the learning capacity of the original network).

Embodiments of a single-layer inner networks may provide many benefits, including requiring very little engineering and better compute efficiency at runtime. Advantageously, some embodiments of a single-layer inner network may provide comparable accuracy as a deeper inner network. Compressing ML models to run on storage-, compute-, and power-constrained devices is quickly becoming a major area of research and industry interest. Existing compression technology may struggle to compress models below 1-2% of their original sizes and/or may add significantly to the computational complexity of the models. Some embodiments may advantageously provide compression technology which improves significantly on low-rank matrix factorization.

Figure 8A:
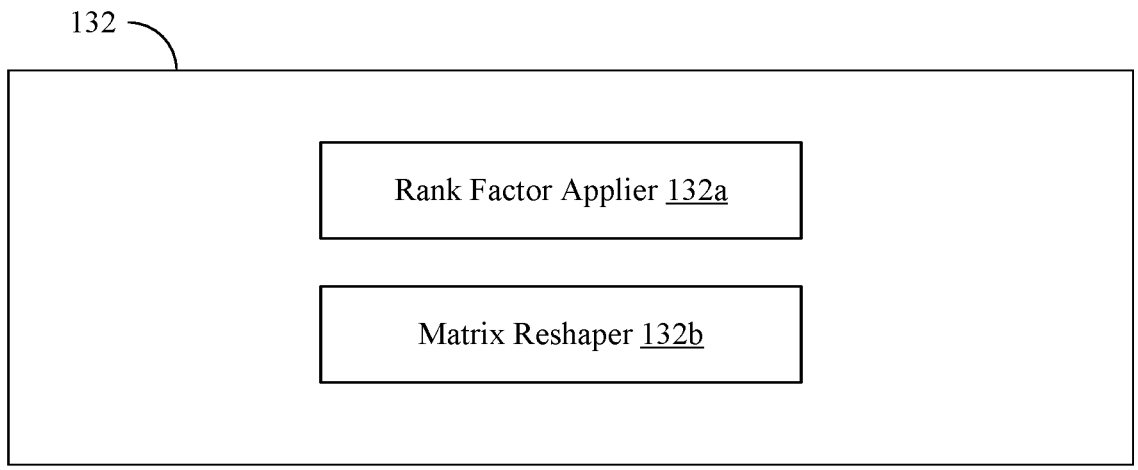
FIGS. 8A and 8B are block diagrams of examples of network compression apparatuses according to embodiments.

FIG. 8A shows a network compression apparatus 132 (132a-132b) that may implement one or more aspects of the method 30 (FIG. 3) and/or the process flow 60 (FIG. 6). The network compression apparatus 132, which may include logic instructions, configurable logic, fixed-functionality hardware logic, may be readily substituted for the decision network 13 or logic 14 (FIG. 1), and/or the ML network 40 (FIG. 4), already discussed. A rank factor applier 132a may include technology to apply a low rank factorization to a weight matrix of a decision network to determine a first weight matrix approximation. A matrix reshaper 132*b* may include technology to reshape the first weight matrix approximation into a second weight matrix approximation. For example, the matrix reshaper 132*b* may be configured to reshape the first weight matrix approximation into the second weight matrix approximation to add nonlinearity to the second weight matrix approximation. In some embodiments, matrix reshaper 132*b* may be configure scatter data from the first weight matrix approximation into the second weight matrix approximation. In some embodiments, the matrix reshaper 132*b* may alternatively, or additionally, be configured to alter the layout of data from the first weight matrix approximation into the second weight matrix approximation. For example, the matrix reshaper 132*b* may be configured to read data from the first weight matrix approximation in a row-major order, and write data into the second weight matrix approximation in a column-major order (e.g., or vice versa). In any of the embodiments herein, the decision network may comprise one or more of a CNN, a DNN, and a RNN.

Figure 8B:
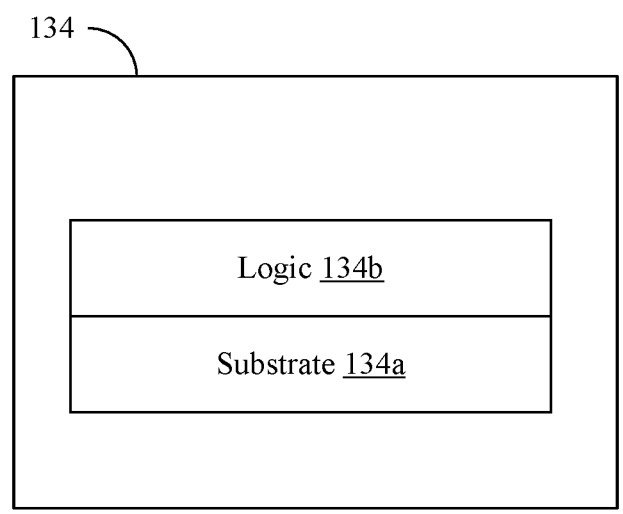

Turning now to FIG. 8B, network compression apparatus 134 (134*a*, 134*b*) is shown in which logic 134*b* (e.g., transistor array and other integrated circuit/IC components) is coupled to a substrate 134*a* (e.g., silicon, sapphire, gallium arsenide). The logic 134*b* may generally implement one or more aspects of the method 30 (FIG. 3) and/or the process flow 60 (FIG. 6). Thus, the logic 134*b* may apply a low rank factorization to a weight matrix of a decision network to determine a first weight matrix approximation, and reshape the first weight matrix approximation into a second weight matrix approximation. For example, the logic 134*b* may be configured to reshape the first weight matrix approximation into the second weight matrix approximation to add nonlinearity to the second weight matrix approximation. In some embodiments, the logic 134*b* may be configure scatter data from the first weight matrix approximation into the second weight matrix approximation. In some embodiments, the logic 134*b* may alternatively, or additionally, be configured to alter the layout of data from the first weight matrix approximation into the second weight matrix approximation. For example, the logic 134*b* may be configured to read data from the first weight matrix approximation in a row-major order, and write data into the second weight matrix approximation in a column-major order (e.g., or vice versa). In any of the embodiments herein, the decision network may comprise one or more of a CNN, a DNN, and a RNN. In one example, the apparatus 134 is a semiconductor die, chip and/or package.

Figure 9:
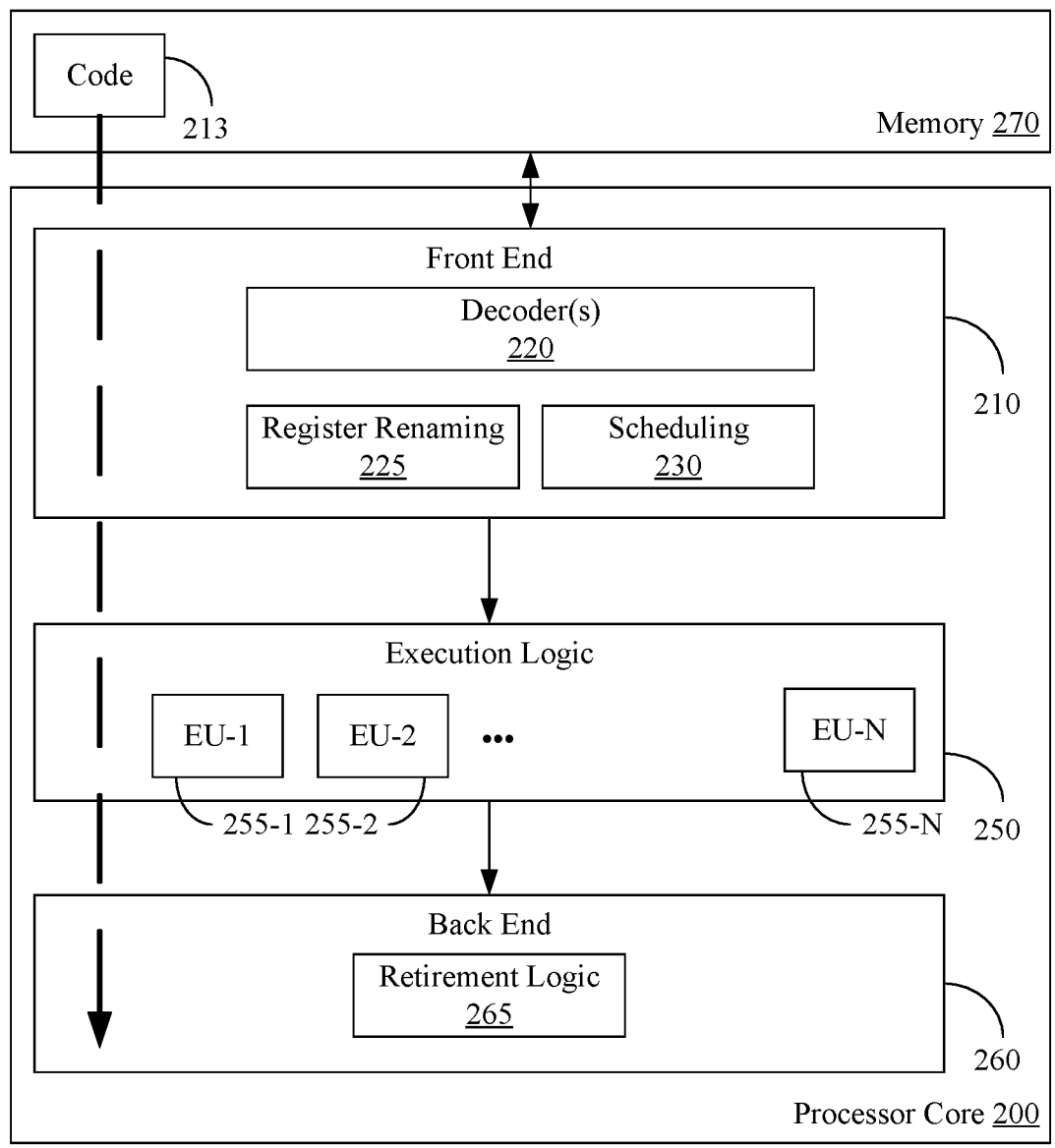
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIG. 3) and/or the process flow 60 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
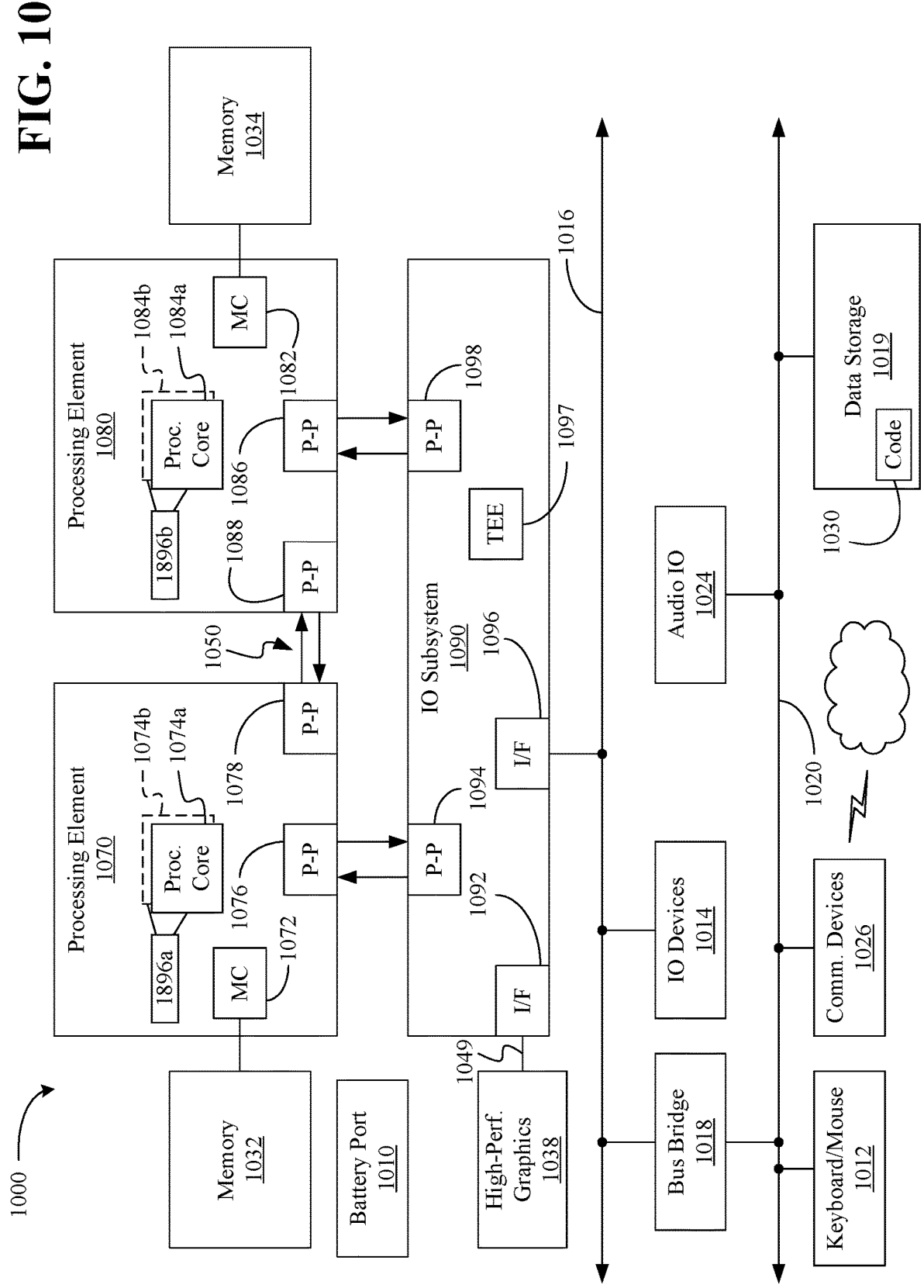
FIG. 10 is a block diagram of an example of a system according to an embodiment.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b* (e.g., static random access memory/SRAM). The shared cache 1896*a*, 1896*b* may store data (e.g., objects, instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIG. 3) and/or the process flow 60 (FIG. 6), already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

Additional Notes and Examples

Example 1 may include an electronic processing system, comprising a processor, memory communicatively coupled to the processor, and a decision network communicatively coupled to the processor and the memory, the decision network including logic to apply a low rank factorization to a weight matrix of the decision network to determine a first weight matrix approximation, reshape the first weight matrix approximation into a second weight matrix approximation, and compress the decision network based on the second weight matrix approximation.

Example 2 may include the system of Example 1, wherein the logic is further to reshape the first weight matrix approximation into the second weight matrix approximation to add nonlinearity to the second weight matrix approximation.

Example 3 may include the system of Example 2, wherein the logic is further to scatter data from the first weight matrix approximation into the second weight matrix approximation.

Example 4 may include the system of Example 2, wherein the logic is further to alter the layout of data from the first weight matrix approximation into the second weight matrix approximation.

Example 5 may include the system of Example 4, wherein the logic is further to read data from the first weight matrix approximation in a row-major order, and write data into the second weight matrix approximation in a column-major order.

Example 6 may include the system of any of Examples 1 to 5, wherein the decision network comprises one or more of a convolutional neural network, a deep neural network, and a recurrent neural network.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to apply a low rank factorization to a weight matrix of a decision network to determine a first weight matrix approximation, and reshape the first weight matrix approximation into a second weight matrix approximation.

Example 8 may include the apparatus of Example 7, wherein the logic is further to reshape the first weight matrix approximation into the second weight matrix approximation to add nonlinearity to the second weight matrix approximation.

Example 9 may include the apparatus of Example 8, wherein the logic is further to scatter data from the first weight matrix approximation into the second weight matrix approximation.

Example 10 may include the apparatus of Example 8, wherein the logic is further to alter the layout of data from the first weight matrix approximation into the second weight matrix approximation.

Example 11 may include the apparatus of Example 10, wherein the logic is further to read data from the first weight matrix approximation in a row-major order, and write data into the second weight matrix approximation in a column-major order.

Example 12 may include the apparatus of any of Examples 7 to 11, wherein the decision network comprises one or more of a convolutional neural network, a deep neural network, and a recurrent neural network.

Example 13 may include the apparatus of any of Examples 7 to 12, wherein the logic coupled to the one or more substrates includes transistor channel regions that are positioned within the one or more substrates.

Example 14 may include a method of compressing a weight matrix, comprising applying a low rank factorization to a weight matrix of a decision network to determine a first weight matrix approximation, and reshaping the first weight matrix approximation into a second weight matrix approximation.

Example 15 may include the method of Example 14, further comprising reshaping the first weight matrix approximation into the second weight matrix approximation to add nonlinearity to the second weight matrix approximation.

Example 16 may include the method of Example 15, further comprising scattering data from the first weight matrix approximation into the second weight matrix approximation.

Example 17 may include the method of Example 15, further comprising altering the layout of data from the first weight matrix approximation into the second weight matrix approximation.

Example 18 may include the method of Example 17, further comprising reading data from the first weight matrix approximation in a row-major order, and writing data into the second weight matrix approximation in a column-major order.

Example 19 may include the method of any of Examples 14 to 18, wherein the decision network comprises one or more of a convolutional neural network, a deep neural network, and a recurrent neural network.

Example 20 may include at least one computer readable storage medium, comprising a set of instructions, which when executed by a computing device, cause the computing device to apply a low rank factorization to a weight matrix of a decision network to determine a first weight matrix approximation, and reshape the first weight matrix approximation into a second weight matrix approximation.

Example 21 may include the at least one computer readable storage medium of Example 20, comprising a further set of instructions, which when executed by the computing device, cause the computing device to reshape the first weight matrix approximation into the second weight matrix approximation to add nonlinearity to the second weight matrix approximation.

Example 22 may include the at least one computer readable storage medium of Example 21, comprising a further set of instructions, which when executed by the computing device, cause the computing device to scatter data from the first weight matrix approximation into the second weight matrix approximation.

Example 23 may include the at least one computer readable storage medium of Example 21, comprising a further set of instructions, which when executed by the computing device, cause the computing device to alter the layout of data from the first weight matrix approximation into the second weight matrix approximation.

Example 24 may include the at least one computer readable storage medium of Example 23, comprising a further set of instructions, which when executed by the computing device, cause the computing device to read data from the first weight matrix approximation in a row-major order, and write data into the second weight matrix approximation in a column-major order.

Example 25 may include the at least one computer readable storage medium of any of Examples 20 to 24, wherein the decision network comprises one or more of a convolutional neural network, a deep neural network, and a recurrent neural network.

Example 26 may include a matrix compression apparatus, comprising means for applying a low rank factorization to a weight matrix of a decision network to determine a first weight matrix approximation, and means for reshaping the first weight matrix approximation into a second weight matrix approximation.

Example 27 may include the apparatus of Example 26, further comprising means for reshaping the first weight matrix approximation into the second weight matrix approximation to add nonlinearity to the second weight matrix approximation.

Example 28 may include the apparatus of Example 27, further comprising means for scattering data from the first weight matrix approximation into the second weight matrix approximation.

Example 29 may include the apparatus of Example 27, further comprising means for altering the layout of data from the first weight matrix approximation into the second weight matrix approximation.

Example 30 may include the apparatus of Example 29, further comprising means for reading data from the first weight matrix approximation in a row-major order, and means for writing data into the second weight matrix approximation in a column-major order.

Example 31 may include the apparatus of any of Examples 26 to 30, wherein the decision network comprises one or more of a convolutional neural network, a deep neural network, and a recurrent neural network.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
a processor;
memory communicatively coupled to the processor; and
a decision network communicatively coupled to the processor and the memory, the decision network including logic to:
  apply a low rank factorization to a weight matrix of the decision network to determine a first weight matrix approximation,
  reshape the first weight matrix approximation into a second weight matrix approximation,
  compress the decision network based on the second weight matrix approximation,
  read a row of data from the first weight matrix approximation in a row-major order, wherein a number of elements in the row is a first number,
  write the row of data from the first weight matrix approximation into a column of the second weight matrix approximation in a column-major order, wherein a number of elements in the column is a second number, wherein the second number is different from the first number, and
  generate a layer of the decision network based on the second weight matrix approximation and through a removal of one or more biases based on the row of data from the first weight matrix approximation being written into the column of the second weight matrix approximation in the column-major order.

2. The system of claim 1, wherein the logic is further to:
reshape the first weight matrix approximation into the second weight matrix approximation to add nonlinearity to the second weight matrix approximation.

3. The system of claim 2, wherein the logic is further to:
scatter data from the first weight matrix approximation into the second weight matrix approximation.

4. The system of claim 2, wherein the logic is further to:
alter a layout of data from the first weight matrix approximation into the second weight matrix approximation.

5. The system of claim 1, wherein the decision network comprises one or more of a convolutional neural network, a deep neural network, and a recurrent neural network.

6. A semiconductor package apparatus, comprising:
one or more substrates; and
logic coupled to the one or more substrates, wherein the logic is at least partly implemented in one or more of configurable logic or fixed-functionality logic hardware, the logic coupled to the one or more substrates to:
  apply a low rank factorization to a weight matrix of a decision network to determine a first weight matrix approximation,
  reshape the first weight matrix approximation into a second weight matrix approximation,
  compress the decision network based on the second weight matrix approximation,
  read a row of data from the first weight matrix approximation in a row-major order, wherein a number of elements in the row is a first number,
  write the row of data from the first weight matrix approximation into a column of the second weight matrix approximation in a column-major order, wherein a number of elements in the column is a second number, wherein the second number is different from the first number, and
  generate a layer of the decision network based on the second weight matrix approximation and through a removal of one or more biases based on the row of data from the first weight matrix approximation being written into the column of the second weight matrix approximation in the column-major order.

7. The apparatus of claim 6, wherein the logic is further to:
reshape the first weight matrix approximation into the second weight matrix approximation to add nonlinearity to the second weight matrix approximation.

8. The apparatus of claim 7, wherein the logic is further to:
scatter data from the first weight matrix approximation into the second weight matrix approximation.

9. The apparatus of claim 7, wherein the logic is further to:
alter a layout of data from the first weight matrix approximation into the second weight matrix approximation.

10. The apparatus of claim 6, wherein the decision network comprises one or more of a convolutional neural network, a deep neural network, and a recurrent neural network.

11. The apparatus of claim 6, wherein the logic coupled to the one or more substrates includes transistor channel regions that are positioned within the one or more substrates.

12. A method comprising:
applying a low rank factorization to a weight matrix of a decision network to determine a first weight matrix approximation;
reshaping the first weight matrix approximation into a second weight matrix approximation;
compressing the decision network based on the second weight matrix approximation;
reading a row of data from the first weight matrix approximation in a row-major order, wherein a number of elements in the row is a first number;
writing the row of data from the first weight matrix approximation into a column of the second weight matrix approximation in a column-major order, wherein a number of elements in the column is a second number, wherein the second number is different from the first number; and
generating a layer of the decision network based on the second weight matrix approximation and through a removal of one or more biases based on the row of data from the first weight matrix approximation being written into the column of the second weight matrix approximation in the column-major order.

13. The method of claim 12, further comprising:
reshaping the first weight matrix approximation into the second weight matrix approximation to add nonlinearity to the second weight matrix approximation.

14. The method of claim 13, further comprising:
scattering data from the first weight matrix approximation into the second weight matrix approximation.

15. The method of claim 13, further comprising:
altering a layout of data from the first weight matrix approximation into the second weight matrix approximation.

16. The method of claim 12, wherein the decision network comprises one or more of a convolutional neural network, a deep neural network, and a recurrent neural network.

17. At least one computer readable storage medium, comprising a set of instructions, which when executed by a computing device, cause the computing device to:
apply a low rank factorization to a weight matrix of a decision network to determine a first weight matrix approximation;
reshape the first weight matrix approximation into a second weight matrix approximation;
compress the decision network based on the second weight matrix approximation;
read a row of data from the first weight matrix approximation in a row-major order, wherein a number of elements in the row is a first number;
write the row of data from the first weight matrix approximation into a column of the second weight matrix approximation in a column-major order, wherein a number of elements in the column is a second number, wherein the second number is different from the first number; and
generate a layer of the decision network based on the second weight matrix approximation and through a removal of one or more biases based on the row of data from the first weight matrix approximation being written into the column of the second weight matrix approximation in the column-major order.

18. The at least one computer readable storage medium of claim 17, comprising a further set of instructions, which when executed by the computing device, cause the computing device to:
reshape the first weight matrix approximation into the second weight matrix approximation to add nonlinearity to the second weight matrix approximation.

19. The at least one computer readable storage medium of claim 18, comprising a further set of instructions, which when executed by the computing device, cause the computing device to:
scatter data from the first weight matrix approximation into the second weight matrix approximation.

20. The at least one computer readable storage medium of claim 18, comprising a further set of instructions, which when executed by the computing device, cause the computing device to:
alter a layout of data from the first weight matrix approximation into the second weight matrix approximation.

21. The at least one computer readable storage medium of claim 17, wherein the decision network comprises one or more of a convolutional neural network, a deep neural network, and a recurrent neural network.

* * * * *